A. RASMUSSEN.
POWER HACKSAW MACHINE.
APPLICATION FILED JULY 19, 1918.
1,334,166.
Patented Mar. 16, 1920.
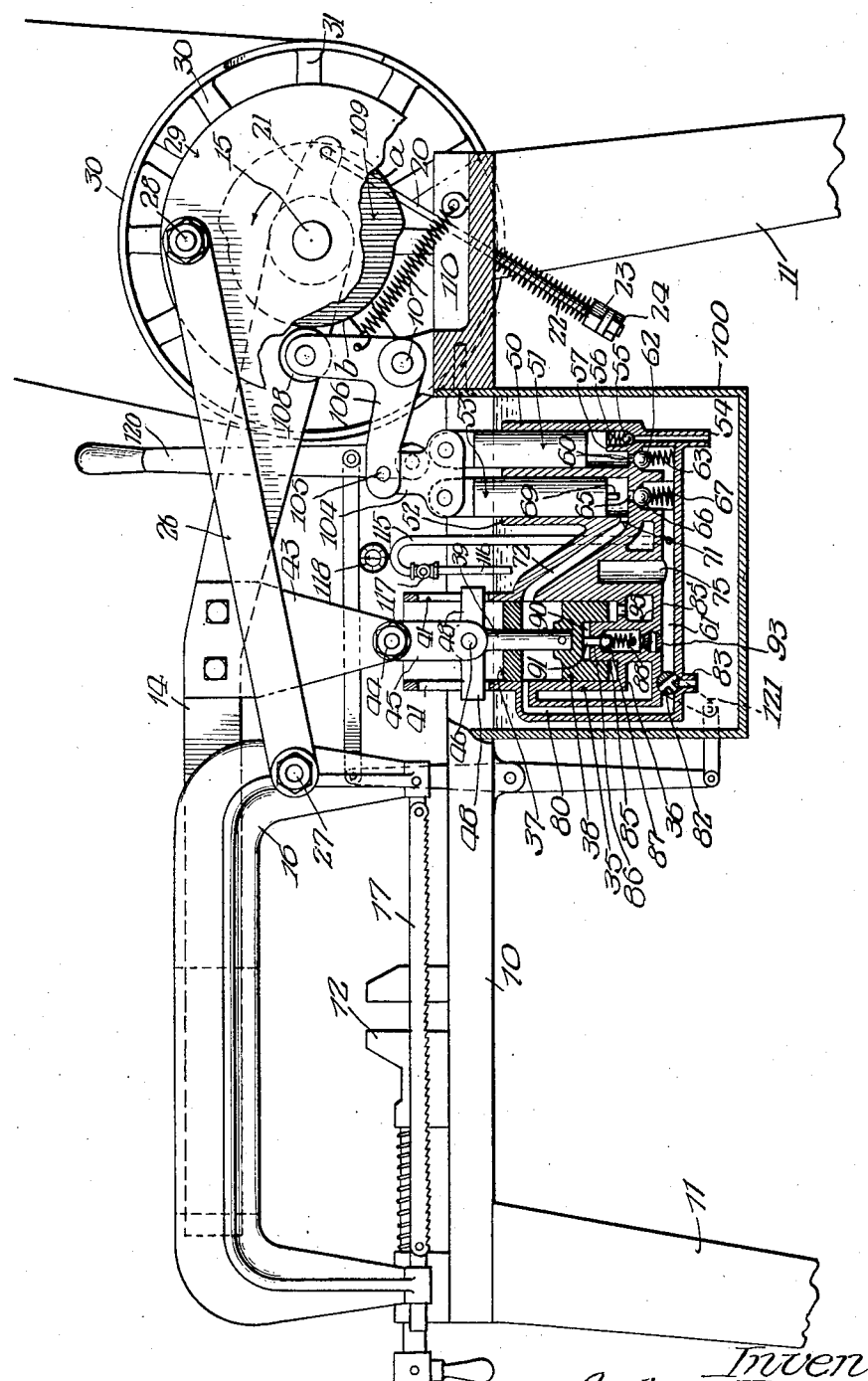
Inventor
Andrew Rasmussen
By William L. Hage

UNITED STATES PATENT OFFICE.

ANDREW RASMUSSEN, OF RACINE JUNCTION, WISCONSIN.

POWER-HACKSAW MACHINE.

1,334,166.  Specification of Letters Patent.  Patented Mar. 16, 1920.

Application filed July 19, 1918. Serial No. 245,712.

*To all whom it may concern:*

Be it known that I, ANDREW RASMUSSEN, a citizen of the United States, and a resident of Racine Junction, in the county of Racine and State of Wisconsin, have invented certain new and useful Improvements in Power-Hacksaw Machines; and I do hereby declare that the following is a full, clear, and exact description thereof, reference being had to the accompanying drawings, and to the characters of reference marked thereon, which form a part of this specification.

This invention relates to improvements in power hack saws, and refers more particularly to improvements in means to feed the saw blade to its work during the cutting stroke and to release it from its work during the non-cutting stroke.

My improvements are herein shown as applied to the type of hack saw illustrated in my prior United States Patent Number 1,211,964, wherein the reciprocating saw frame is normally overbalanced in such manner that when the feed mechanism is released the saw frame will be overbalanced to carry the saw away from the work. This occurs at the end of the cutting stroke whereby the saw does not drag on the bottom of the work during its non cutting or return stroke.

The present improvements relate to novel means for feeding the saw to its work during its cutting stroke, said improvements being constructed and arranged to effect a desired cutting pressure of the saw on the work without lost motion between the feed device and the saw and to effect uniform rise of the saw at each operation.

Another object of the invention is to provide a novel feed mechanism for power hack saws which is constructed and arranged to apply the pressure of the saw blade lightly on the work in the first strokes of the saw and to gradually increase said feed pressure as the saw cuts into the work until a predetermined feed pressure is attained, so that when sawing round stock the full feed pressure of the saw blade is not exerted on the saw blade at a time when it strikes the upper portion of the arc of the work and when, therefore, the force of the feed pressure is transmitted through but few adjacent saw teeth. Said feed control is also operative to protect the saw blade when working on irregular work, having sharp angles, which the saw blade first attacks. Thereby is avoided the danger of breaking the saw blade under these conditions.

Another object of the invention is to provide means by which the feed pressure on the saw blade may be reduced at or near the end of the saw cut to correspond with the width of saw cut against which the saw blade is acting, so that, for instance, when cutting round stock, the feed pressure is released as the saw blade reaches the lower arc of the work, or when cutting irregularly angled work, the feed pressure may be reduced when the saw passes into thin stock near the end of the saw cut. The latter feature of the invention may be combined with means to reduce the feed pressure at the end of the saw cut operative at will. The reduced pressure results in a clean cut at the end of the operation.

A further object of the invention is to provide a novel hydraulic feed mechanism for power hack saw machines combined with pneumatic cushioning means to gradually build up the feed pressure and also to cushion the feed of the saw blade.

Another object of the invention is to provide a novel feed mechanism for power hack saws constructed with suitable cylinders and passages, and provided with valves connecting the cylinders and passages, so arranged that a fluid, preferably a noncompressible fluid, may be directed by suitable pumping and measuring means to a feed cylinder whose piston is operatively connected to the saw mechanism, in such manner as to apply the desired feed pressure to the mechanism and to allow the saw to rise at the proper times.

Another object of the invention is to provide, in connection with a hydraulic feed mechanism, means to effect the diversion of a quantity of the fluid under pressure to the feed cylinder during the cutting stroke of the saw and to withdraw from the feed cylinder during the non-cutting stroke of the saw a quantity of the fluid so diverted thereto to permit the saw to rise from the bottom of the saw cut so that the saw blade may be shifted back to its working position without dragging on the bottom of the saw cut.

Another object of the invention is to provide novel means for permitting the saw to rise from the saw table or bed after the saw has completed its cut through the work, constructed and arranged with means to slow down or brake the retiring movement of the saw under the influence of the overbalancing of the saw frame or otherwise; and said releasing means may be associated with a belt shifting device or other means for stopping and starting the machine to be thereby operated when the saw is stopped. Preferably, such means for releasing the saw from the feed mechanism is such as to permit the saw frame and guide to be freely raised and lowered when adjusting other work under the saw.

A further object of the invention, in connection with the means for gradually building up the feed pressure in the first stroke of the saw, is to provide means for regulably limiting the feed pressure, so that when a predetermined feed pressure is attained it will not be exceeded for a given adjustment of said feed pressure.

Other objects of the invention are to improve and simplify feed mechanisms for power hack saw machines, and the invention consists in the combination and arrangement of the parts shown in the drawings and described in the specification, and pointed out in the appended claims.

The figure of the drawing is a side elevation of a saw to which my invention is applied, showing the feed mechanism in vertical section and portions of the saw mechanism broken away.

Only those portions of the saw machine proper necessary to illustrate the adaptation of my invention thereto are shown.

The machine shown comprises a table 10 supported on legs 11, and said table supports the usual vise 12 to hold the work in the machine. 14 designates a vertically swinging saw frame guide and support that is pivoted at its rear end to the main drive shaft 15; and said frame guide and support carries at its forward end the usual sliding saw frame 16 between the legs of which is stretched a hack saw blade 17. The weight of the vertical swinging saw frame guide and the saw frame carried thereby is counterbalanced so that the outer end of the supporting frame and guide, when not under the influence of the feeding mechanism, tends to swing away from the saw table. This overbalancing effect can be produced by either overweighting the swinging saw supporting frame in rear of the main drive shaft 15 or may be effected by spring pressure. As herein shown, the latter is employed, which embraces a rod or link 20 that is loosely connected at its upper end to a tail piece 21 of said frame 14. Said rod extends through an apertured portion of the table. Below said table and surrounding said rod is a spiral spring 22 which is interposed between a shoulder on the table and a shoulder at the lower end of the rod or link, comprising a nut 23 threaded to said rod and locked thereon by a lock nut 24. When the adjusting nut or shoulder 23 is threaded upwardly or toward the spring 22, the tension is exerted through said spring to overbalance the saw supporting frame and guide; and the overbalancing effect is varied by the position of the adjusting screw 23 and the strength of the spring 22.

The reciprocating saw frame 16 is operated through the medium of a pitman or connecting rod 26 which is loosely connected at one end 27 to the saw frame and at its other end by means of a crank pin 28 with a crank disk 29 that is fixed to and rotates with the main drive shaft 15. Said shaft is provided with the usual tight and loose pulleys 30, 31 by which power may be applied to operate the machine.

Referring now to the details of the feed mechanism embodying the present invention, the same are made as follows:

35 designates a feed cylinder provided with a lower cylinder head 36 and an upper cylinder head 37. 38 designates a piston therein, whose piston rod 39 extends through a bearing in the piston head 37. The cylinder wall is provided with a guide extension provided with diametrically opposed guide slots 41. 43 designates an arm which is fixed to the rising and falling saw supporting frame 14 at its upper end. It is loosely connected at its lower end by a pin 44 with a link 45. Said link is loosely connected at its lower end by a pin 46 with the upper end of the piston rod 39 above the upper head of the cylinder. The piston rod is also provided at its upper end with oppositely extending guide arms 48 that extend into said guide slots 41 and constitute a guide for the link 45 and the upper end of the piston rod.

50 designates a vertical pump cylinder in which reciprocates an elongated piston or plunger 51. 52 designates another cylinder, herein shown as located at the side of and axially parallel with the cylinder 50, and 53 designates an elongated plunger which reciprocates in said piston 52.

Leading from the lower end of the cylinder 51 is an intake 54 through which a fluid, such as oil is drawn into the cylinder 50 when the piston 51 therein rises. The said intake passage is controlled at its upper end by a valve 55, herein shown as having the form of a ball valve which is pressed downwardly against an upwardly facing seat at the upper end of the passage 54 by a spring 56 that is contained in a cage 57 at the lower end of the cylinder 50. The lower end of the cylinder is also provided with a discharge port 60. This port affords communication with a closed distributing passage or space 61 in which the feed pressure is built up. The port 60 has a downwardly facing seat that is engaged by a spherical valve 62 which is normally held against its seat by a spring 63.

The lower head of the cylinder 52 is likewise provided with a port 65 through which is afforded communication between the cylinder 52 and the distributing space 61. Said port 65 has a downwardly facing seat which is closed by a spherical valve 66, urged against its seat by the spring 67. Said valve is adapted to be forced off its seat near the extremity of the down stroke of the plunger 53 by an axial extension 69 of said plunger in a manner hereinafter described. The cylinder 52 is provided near its bottom with a lateral port 71 which communicates with one end of a passage 72 that communicates at its other end with the space in the feed cylinder 35 above its piston 38. 75 designates a compression chamber that communicates with the distributing space 61 and extends upwardly therefrom and is closed at its upper end.

80 designates a release passage which communicates at its upper end with the space of the cylinder 35 above its piston 38, and said release passage communicates at its lower end with the distributing space or passage 61. At or near the junction of the passage 80 with the space 61 is a three-way valve 82 of any common or preferred form, which is constructed and arranged in one adjustment to afford communication of the distributing space 61 and the release passage 80 with the outlet branch 83 of said valve, to thereby permit the fluid to escape from the closed passage 61 and cylinder 35. In the other adjustment of the valve both the cylinder 35 and distributing space are cut off from the outlet branch 83 and from each other.

The cylinder 35 is provided at its lower head with an interior upstanding shell 85 that is formed at its top with a release port and is provided interiorly with a downwardly facing seat that is controlled by a spherical valve 87 which is normally held to its seat by a spring 88. The said shell is in communication with the distributing passage or pipe 61 through a branch 85'.

The piston 38 is provided with a central or axial downwardly opening recess 90 which closely receives the upper end of said shell when the piston is near the lower limit of its travel. The piston is provided at the top of its chambered portion with a central depending pin 91 which, as the piston approaches the lower limit of its travel, extends through the port of the shell 85 and engages and unseats the valve 87, so as to establish communication between the distributing space 61 and that area of the under face of the cylinder represented by the top wall of the recess 90. At times when it is not desired to so establish communication between the distributing space 61 and the interior of the shell 85, the branch 85' may be closed by any suitable form of cut-off valve 93 located in the branch between the valve 87 and distributing space 61.

The lower head of the cylinder 35 is provided with a release port 95 which opens to the space surrounding said cylinder. Preferably and as herein shown, the entire mechanism described is inclosed in a casing or shell 100 which depends from the table 10 and may be attached thereto in any suitable manner. This shell constitutes a reservoir for a fluid, such as oil, which serves as a medium for transmitting pressure to the saw feeding mechanism and also as means for lubricating the several movable parts of the mechanism. Furthermore, as herein shown and as may be constructed, the various cylinders and the passages connecting them are formed in a single casting or unit. However, this phase of the construction may be optionally departed from.

The cylinder 50 and plunger 51 constitute a pump for maintaining a suitable pressure in the system, while the cylinder 52 and plunger 53 constitute means for intermittently diverting or transmitting small quantities of fluid under pressure in said system through the passage 72 to the cylinder space in the feed cylinder 35 above the piston 38 thereof. So far as the essential operation of the invention is concerned, the pump comprising the cylinder 50 and the plunger 51, may be of any other form, as, for instance, it may be a rotary pump and may or may not be connected to the measuring pump to operate synchronously therewith; the function of the pressure pump being merely to maintain the proper pressure in the system. As herein shown, however, the plungers 51 and 53 of the pressure and measuring pumps are shown as simultaneously operated from a single point of power. To this end, a coupling yoke 104 is loosely connected to the upper ends of said plungers 51 and 53 and the upper end of said yoke is connected by a pin 105 with one arm of a bell crank lever 106 that is pivotally mounted at 107 in a bearing on the table 10. The other arm of said bell crank lever carries a roller 108 which rides on the periphery of a cam 109 that is fixed to the main drive shaft 15. The said roller 108 of the bell crank lever may be held in engagement with the periphery of said cam by means of a spiral contractile spring 110 fixed at one end to the upstanding arm of said bell crank lever and anchored at its other end in any suitable manner to the table 10. When the higher portion $a$ of said cam engages said roller the plungers 51, 53 are depressed through the action of the bell crank lever, and when the lower portion $b$ of the cam engages the roller 108 the spring 110 may serve to raise said plungers.

The operation of the feed mechanism described is as follows:

It will be noted that the plunger 51 is depressed and raised once during each rotation of the drive shaft and the cam 109 and also that the plunger 53 is likewise depressed and raised synchronously therewith. As before stated, however, the relation of the strokes of the pump plunger to the measuring plunger is not essential to the operation of the pump plunger. The operation of the measuring plunger to cause it to fall and rise once during each rotation of the cam 109 is essential, however, as the mechanism is organized, to properly time the feed mechanism.

The upward reciprocation of the plunger 51 serves to draw fluid from the tank or chamber 100 through the valved inlet 54 into the lower end of the cylinder 50. The depression of the plunger 51 expels said fluid downwardly through the valved port 60 into the distributing space. At the beginning of the operation of the saw, the pressure space 61 is filled with fluid under normal pressure, and pressure is built up in said space against the air cushion in the air chamber 75 by the operation of the pump in the first few strokes of the saw, which at the beginning may be idle strokes. After the desired pressure begins to build up in the system, including the distributing space and pressure chamber 75 and feed cylinder 35, to cause the saw blade to be pressed lightly on the work, the operation of sawing begins, and feed pressure is built up gradually against the piston 38 until a predetermined feed pressure is attained. The feed pressure first is transferred against the piston 38 by the action of the plunger 53 in its reciprocation by transferring the liquid in the cylinder 52 below the plunger 53 which theretofore in the last stroke of the plunger 53 was withdrawn from the feed cylinder by the ascent of said plunger, and afterward, by the contact of the pin 69 with the valve 66 the valve is unseated to divert fluid under pressure from the pressure space 61 to the feed cylinder 35 above its piston 38. Said valve 66 is opened at about the time the saw has reached the beginning of its cutting stroke, and the pressure of the fluid transmitted from the system into the cylinder 35 acts to force the feed piston 38 downwardly and, through the piston rod 39, link 45, and arm 43, to feed the saw to the work. The air chamber 75 contains a body of air which is gradually compressed as the fluid such as oil, is forced into the distributing space, and the extent of the compression of the body of air in said chamber 75 determines the pressure at which the fluid is delivered against the feed piston 38. The feed pressure on the piston 38 is maintained throughout the cutting stroke of the saw blade, which, in the present instance, is the back stroke thereof. It will be understood that the fluid under pressure is transmitted to the feed cylinder 35 above the piston 38 at a time when the bell crank roller 108 is traveling on the high portion of the cam 109, and at which time also the projection 69 is thereby depressed to unseat the valve 66. However, the lower end of the plunger does not at this time pass the receiving end of the port 71 which communicates with the feed cylinder passage or by-pass 72.

At the end of the cutting stroke of the saw the bearing roller 108 of the bell crank lever 106 passes onto the lower portion $b$ of the cam and the spring 110 raises said plunger. When the plunger is thus raised, a small portion of the fluid is withdrawn from the upper end of the feed cylinder 35 through the by-pass 72 to permit the piston 38 to slightly rise and thereby permit the saw blade to be raised sufficiently to clear it from the bottom of the saw cut so that the saw will not ride on the bottom of the saw cut in the return or the non-cutting stroke of the saw. The valve 66 is closed by the pressure below the moment the plunger begins to rise. At the beginning of each cutting stroke, after the saw is set in operation to cut off a piece of work, the depression of the plunger 53 in the cylinder 52 will force the fluid contained in the cylinder below the piston through the passage 72 into the feed cylinder before the valve 66 is unseated by the plunger projection 69, so that the first feed pressure exerted on the piston 38 at the beginning of each cutting stroke of the saw is that due to the displacement of the fluid in the cylinder 52; and this feed pressure is supplemented by the higher pressure in the distributing space 61 when the plunger descends sufficiently to unseat the valve 66.

The body of air in the pressure chamber 75 serves as a cushion to cushion the feeding effect of the fluid transmitted under pressure to the upper end of the feed cylinder. Should work of unexpected hardness be encountered by the saw or should the cutting edge of the saw be irregular, there will be some yielding of the saw feed due to the cushioning effect of the body of air in the compressing chamber 75.

The provision of the central stud 91 in the recessed portion of the piston 38, so located as to unseat the valve 87 that controls the port 86 of the upstanding shell in the lower end of the feed cylinder, provides means to reduce the feed pressure on the saw blade as said blade is nearing the end of its through cut in the work when cutting round or irregular angled stock. It is desirable to thus reduce the feed pressure when cutting round stock for the reason that as the saw blade approaches the lower arc of the stock the length of the saw cut decreases, and if the full operative pressure be maintained on the saw, there would be a tendency to break the teeth of the saw blade, and also, there would be a tendency for the blade to break through the work in the final strokes in a manner to leave an objectional bur on the stock. The reduction of the feed pressure on the saw when approaching the end of the cut is due to the fact that the unseating of the valve 87 by the stud 91 permits fluid from the distributing space 61 to be by-passed to the under side of the feed piston above the shell 85, and the pressure from the distributing passage 61 acts on that portion of the lower piston face representing the upper wall of the recess to effect a differential pressure from the same source against unequal areas of the upper and lower faces of the piston. This has the effect to neutralize a portion of the feed pressure acting on the upper face of the piston and to reduce the feed pressure.

When operating on work providing uniform support for the saw teeth, throughout the cut, such as flat bars, such differential feed pressure will not be required. In this event, therefore, the valve 93 may be closed so that contact of the stud 91 with the valve 87 does not by-pass any portion of the pressure fluid to act on the lower face of the feed piston 38.

It will thus be understood that I have provided a feed mechanism which feeds the saw blade to the stock with a delicate pressure at the beginning of the operation and gradually builds up the pressure to a predetermined point as the work proceeds, and which is also constructed to reduce the feed pressure as the saw blade approaches the end of the cut. The regulation of the feed pressure at the beginning and at the end of the cut is advantageous inasmuch as it avoids undue pressure on a few adjacent teeth of the saw blade at the beginning and at the end of the cut tending to break the teeth, and also avoids ragged burs on the stock at the end of the cut. Moreover, the light pressure at the beginning of the cut makes it easier to direct the saw blade to the proper point on the stock, and also saves wear on the teeth of the saw blade at the beginning of the cut, and the advantage of so applying the saw blade to the work with a light pressure at the beginning of the cut is that time is given for the cutting compound to begin to flow freely on the blade and the work before substantial feed pressure is exerted on the saw. In practice the feed compound is delivered to the saw and to the work by a pump operated by connection with a moving part of the sawing machine. Owing to the length of pipe connection between the pump and discharge end of the pipe, the flow of the cutting compound on the saw does not begin immediately upon the operation of the machine. If full feed pressure be exerted on the saw, the saw will begin to cut without lubrication, with a result of injury to the saw blade. In the present construction, substantial feed pressure of the saw blade on the work will not be exerted until time is given for the cutting compound to flow.

At the end of the saw cut on any given piece of stock being operated upon, and preparatory to allowing the saw frame to rise freely under the influence of the overbalancing spring 22, it is necessary that fluid under pressure be released from the feed cylinder above the piston 38. It is also necessary that the fluid under pressure be released from the distributing space 61 so that in the beginning of the next cutting operation the feed pressure during the first cutting strokes will be light and will be gradually built up to normal operating pressure as the work proceeds. This is effected by adjusting the three-way valve 82 so as to connect the drain pipe 80 and the distributing passage 61 to the outlet branch 83 of said three-way valve. This may be effected either manually or automatically by some suitable means associated with the belt shifter or other means for controlling the stopping and starting of the machine. When employing a belt shifter, the lever 120 may be assumed to be the operating lever therefor, in addition to any automatic control of the belt shifter that may be provided. In such event, the controlling member 121 of the valve, which will be brought out through the wall of the casing or shell 100 in any suitable manner, may be operatively connected to said lever 120, as indicated in dotted and full lines in the drawing.

In practice, some means will be provided to avoid the building up of too great a feed pressure in the system for particular sawing operations such as would impose too severe work on the saw blade when cutting hard material. The means for preventing the building up of undue feed pressure may also be associated with means whereby the pressure so built up can be variably adjusted for different kinds of work. For instance, when operating on soft material, the saw may be fed rapidly without injury thereto, and when operating upon harder materials, a lesser feed pressure would be indicated. Furthermore, the feed pressure should be varied to suit the conditions of the saw blades. For sharp saw blades, the feed pressure should be relatively lighter than for duller blades. I have herein shown one practical means for controlling the feed pressure in the system which is made as follows.

115 designates a pipe which rises from the distributing space 61 to a level above the fluid in the casing 100. Said pipe is provided with a downturned end 116 which may be submerged in the fluid in the casing. Located in said pipe 115 or 116, the latter as herein shown, is a relief valve 117 which, operating in the known manner of ordinary adjustable relief valves, may be set to hold a predetermined pressure and to release the pressure when exceeding the predetermined pressure. If desired, the operative part of the valve may be equipped with or coöperate with a dial so that the user may be apprised how to adjust the valve for different stocks. Thus, when sawing soft material having a known resistance to the ordinary hack saw blade, or when using a dull blade, it may be assumed that the operating pressure will be a given number of pounds. When operating on harder materials or with sharper blades, the valve will be set to allow it to release at a lower pressure. If desired, a gage 118 may be inserted in or coöperate with the pipe 115 between the relief valve and the distributing passage or space 61.

It will be understood that the structural details of the device may be considerably varied within the scope and spirit of the invention and that the invention is not limited to the illustrated details except as to claims wherein they are specifically set forth or as imposed by the prior art. While, in the construction herein shown, the saw is moved away from the work table by reason of the overbalance of the saw supporting frame and guide, the saw may be otherwise raised from its work so far as certain other features of the invention are concerned.

While the cutting tool shown is a hack saw, the feed mechanism may be applied to other cutting tools where like conditions obtain of feeding the tool to its work and retracting it therefrom.

I claim as my invention:

1. A power hack saw machine comprising, in combination, a vertically movable saw supporting guide which is overbalanced to move the saw support away from the work table during the non-cutting stroke of the saw, and feed means constructed to lightly apply the saw to the work during the first few strokes and to gradually increase the feed pressure of the saw on the work to a predetermined point as the saw cuts into the work.

2. A power hack saw machine comprising, in combination, a vertically movable saw supporting guide which is overbalanced to move the saw support away from the work table during the non-cutting stroke of the saw, feed means constructed to lightly apply the saw to the work during the first few strokes and to gradually increase the feed pressure of the saw on the work to a predetermined point as the saw cuts into the work, and means to reduce the feed pressure as the saw approaches the limit of its through cut in the work.

3. A power hack saw machine comprising, in combination, a vertically movable saw supporting guide which is overbalanced to move the saw supporting guide which is overbalanced to move the saw support away from the work table during the non-cutting stroke of the saw, feed means constructed to lightly apply the saw to the work during the first few strokes and to gradually increase the feed pressure of the saw on the work to a predetermined point as the saw cuts into the work, and means to reduce the feed pressure as the saw approaches the limit of its through cut in the work, combined with means operative at the limit of the saw cut through the work to release the saw supporting guide from the feed means.

4. A power hack saw machine comprising, in combination, a vertically movable saw supporting guide which is overbalanced to move the saw support away from the work table during the non-cutting stroke of the saw, and hydraulic feed means connected to said guide and acting in opposition to the overbalanced guide to feed the saw to the work during the cutting stroke thereof.

5. A power hack saw machine comprising, in combination, a reciprocating saw frame, a vertically movable supporting guide therefor, means acting on the guide to overbalance the guide and saw frame to lift the saw from the work during the non-cutting stroke thereof, and hydraulic feed means connected to the guide and acting in opposition to the overbalancing means to feed the saw to its work during the cutting stroke thereof.

6. A power hack saw machine comprising, in combination, a vertically movable saw supporting guide which is overbalanced to move the saw support away from the work table during the non-cutting stroke of the saw, and hydraulic feed means connected to the guide adjacent to the saw supporting end thereof and acting in opposition to the overbalanced guide to feed the saw to its work during the cutting stroke thereof.

7. A power hack saw machine comprising, in combination, a saw supporting guide movable toward and from the work, and hydraulic feed means operatively connected to said guide to feed the saw to its work during the cutting stroke thereof, said feed means being constructed with means to lightly apply the saw to the work during the first few cutting strokes and to gradually increase the feed pressure to a predetermined point as the cutting stroke proceeds.

8. A power hack saw machine comprising, in combination, a saw supporting guide movable toward and from the work, and hydraulic feed means operatively connected to said guide to feed the saw to its work during the cutting stroke thereof, said feed means being constructed with means to lightly apply the saw to the work during the first few cutting strokes and to gradually increase the feed pressure to a predetermined point as the cutting stroke proceeds, combined with means, operative, when the saw approaches its final cut through the work, to reduce the feed pressure.

9. A power hack saw machine comprising, in combination, a saw supporting guide movable toward and from the work, hydraulic feed means operatively connected to said guide to feed the saw to its work during the cutting stroke thereof, said feed means being constructed with means to lightly apply the saw to the work during the first few cutting strokes and to gradually increase the feed pressure to a predetermined point as the cutting stroke proceeds, combined with means, operative, when the saw approaches its final cut through the work, to reduce the feed pressure, and means to render the feed pressure reducing means inoperative.

10. A power hack saw machine comprising, in combination, a saw supporting guide movable toward and from the work, and hydraulic feed means operatively connected to said guide to feed the saw to its work during the cutting stroke thereof, said feed means being constructed with means to lightly apply the saw to the work during the first few cutting strokes and to gradually increase the feed pressure to a predetermined point as the cutting stroke proceeds, combined with means, operative when the saw approaches its final cut through the work, to reduce the feed pressure.

11. A power hack saw machine comprising, in combination, a saw supporting guide movable toward and from the work, hydraulic feed means operatively connected to said guide to feed the saw to its work during the cutting stroke thereof, said feed means being constructed with means to lightly apply the saw to the work during the first few cutting strokes and to gradually increase the feed pressure to a predetermined point as the cutting stroke proceeds, means operative when the saw approaches its final cut through the work to reduce the feed pressure, and regulable relief means to vary the ultimate operative feed pressure.

12. A power hack saw machine comprising, in combination, a saw supporting guide movable toward and from the work, and hydraulic feed means embracing a cylinder, a piston therein operatively connected to said guide, means for admitting a fluid under pressure to said cylinder during the cutting strokes of the saw to feed the saw to its work, and means to release small quantities of fluid from the cylinder during the non-cutting strokes of the saw.

13. A power hack saw machine comprising, in combination, a vertically movable saw supporting guide which is overbalanced to move said guide away from the work table during the non-cutting stroke of the saw, and hydraulic feed means embracing a cylinder, a piston therein operatively connected to said guide, means for admitting a fluid under pressure to said cylinder during the cutting stroke of the saw to feed the saw to its work, and means to release fluid from the cylinder during the non-cutting stroke of the saw.

14. A power hack saw machine comprising, in combination, a saw supporting guide movable toward and from the work, and hydraulic feed means embracing a cylinder, a piston therein operatively connected to said guide, means for admitting a fluid under pressure to said cylinder against said piston during the cutting stroke of the saw to feed the saw to its work, means to release a small quantity of fluid from the cylinder during the non-cutting stroke of the saw, and means operative when the saw blade approaches the saw table to reduce the feed pressure of the saw on the work.

15. A power operated cutting tool comprising, in combination, a tool support movable toward and from the work, and hydraulic feed means comprising a cylinder, a piston therein operatively connected to the tool support, means operative during the cutting movement of the tool to admit fluid under pressure to the cylinder space against one face of the piston, said cylinder being provided adjacent to the other face of the piston with a valved port, means for directing fluid under pressure to said valved port, and means carried by the piston to open said valved port to admit fluid under pressure to an area of the latter side of the piston smaller than the area of the feed face thereof.

16. A power operated cutting tool comprising, in combination, a tool support movable toward and away from the work, and hydraulic feed means comprising a cylinder, a piston therein operatively connected to said support, means to admit fluid under pressure to the cylinder space against one face of the piston during the cutting operation of the tool, means to release fluid from the cylinder to permit the tool to recede from the work, said cylinder being provided adjacent to the other face of the piston with a shell having a valved port which communicates with the cylinder space, means to direct fluid under pressure to said shell exterior to said valved port, the cylinder being provided with a recess to receive said shell when the cylinder approaches one limit of its stroke, and means carried by the piston for opening said valved port when the shell enters said piston recess.

17. A power operated cutting tool comprising, in combination, a tool support movable toward and from the work, and hydraulic feed means embracing a cylinder, a piston therein operatively connected to said support, means for admitting a fluid under pressure to said cylinder against one face of said piston during the cutting stroke of the tool, means to release fluid from the cylinder, said cylinder being provided at its end remote from the feed face of the piston with a shell having a valved port communicating with the cylinder, a passage connecting said shell to a space containing fluid under pressure, and a controlling valve in said passage exterior to said valved port, said piston being recessed to receive said shell and provided in said recess with means for opening the valved port when the piston approaches one limit of its stroke.

18. A power hack saw machine comprising, in combination, a vertically movable saw supporting guide, and hydraulic feed means embracing a cylinder, a piston therein operatively connected to said guide, means for admitting fluid under pressure to said cylinder during the cutting stroke of the saw to feed the saw to its work, means to release fluid from the cylinder during the non-cutting stroke of the saw, a relief pipe connected to the cylinder space above said piston, and a valve in said relief pipe constructed when opened to afford slow escape of fluid from the cylinder to permit the saw guide to slowly rise from the work.

19. A power hack saw machine comprising, in combination, a vertically movable saw supporting guide which is overbalanced to move the saw support away from the work table during the non-cutting stroke of the saw, and hydraulic feed means comprising a feed cylinder, a piston therein, a piston rod connected to the piston and extending through the head of the cylinder, said cylinder being provided with a slotted guide, a guide arm connected to the piston rod and engaging said slotted guide, a connection between the piston rod and the saw guide, means for admitting fluid under pressure to the cylinder space above the piston during the cutting stroke of the saw, and means for releasing fluid from said cylinder space during the non-cutting stroke of the saw.

20. A power operated cutting tool comprising, in combination, a reciprocating tool support, hydraulic feed means to feed the tool to its work, and pneumatic cushioning means coöperating with the hydraulic feed means, for the purpose set forth.

21. Feed means for power hack saw machines comprising, in combination, a vertically movable saw supporting guide which is overbalanced to move the saw away from the work during the non-cutting stroke of the saw, a cylinder, a piston therein operatively connected to said supporting guide, and means operative during the entire cutting stroke of the saw to force fluid under pressure into said cylinder and acting on the piston to feed the saw to its work.

22. Feed means for power hack saw machines comprising, in combination, a vertically movable saw supporting guide which is overbalanced to move the saw away from the work during the non-cutting stroke, a cylinder, a piston therein operatively connected to said supporting guide, means operative during the cutting stroke of the saw to force fluid under pressure into said cylinder and acting on the piston to feed the saw to its work, and means to fully release fluid from said cylinder to permit the saw supporting guide to rise to the full limit of its upward movement.

23. Feed means for power operated cutting tools comprising, in combination, a tool support movable toward and from the work, a cylinder, a piston therein operatively connected to said support, a closed distributing space, a pump for pumping fluid into said space, and measuring means for releasing fluid under pressure from said space to the cylinder to act on said piston to feed the tool to the work.

24. Feed means for power operated tools comprising, in combination, a tool support movable toward and away from the work, a cylinder, a piston therein operatively connected to said support, a closed distributing space, means to pump fluid into said space and to maintain a predetermined pressure therein, and measuring means operative during the cutting stroke of the tool to transfer fluid from said distributing space to the cylinder against the piston to feed the tool to the work.

25. Feed means for power hack saw machines comprising, in combination, a movable saw supporting guide, a feed cylinder, a piston therein operatively connected to said guide, a closed distributing space to contain fluid, means to supply fluid to said distributing space and to maintain a predetermined pressure therein, a measuring cylinder provided with a valved port communicating with said distributing space and provided with a passage which connects said measuring cylinder with the feed cylinder above said piston, a plunger in the measuring cylinder, means to connect said plunger with the saw operating mechanism to cause it to reciprocate during each operation of the saw, and means carried by the piston for opening said valved port during the cutting stroke of the saw.

26. Feed means for power hack saw machines comprising, in combination, a movable saw supporting guide, a feed cylinder, a piston therein operatively connected to said guide, a closed distributing space to contain fluid, means to force fluid under pressure to said space, means operative during each cutting stroke of the saw to divert a quantity of said fluid to the feed cylinder against the piston to feed the saw to the work, means operative during each non-cutting stroke of the saw to release a quantity of fluid from said cylinder, and a pressure chamber in communication with the distributing space to contain a body of air against which the fluid in said space is forced to build up a predetermined feed pressure in said space.

27. Feed means for power hack saw machines comprising, in combination, a movable saw supporting guide, a feed cylinder, a piston therein operatively connected to said guide, a closed distributing space to contain fluid, means to force fluid under pressure to said space, means operative during each cutting stroke of the saw to divert a quantity of said fluid to the feed cylinder against the piston to feed the saw to the work, means operative during each non-cutting stroke of the saw to release a quantity of fluid from said cylinder, a pressure chamber in communication with the distributing space to contain a body of air against which the fluid in said space is forced to build up a predetermined feed pressure in said space, and means to regulably release pressure from said space.

28. Feed means for power hack saw machines comprising, in combination, a movable saw supporting guide, a feed cylinder, a piston therein operatively connected to said guide, a closed distributing space to contain fluid, means to supply fluid under pressure to said distributing space, a measuring cylinder provided with a valved port communicating with said distributing space and provided with a passage which connects it to the feed cylinder above said piston, a plunger in the measuring cylinder, means to connect said plunger to the saw operating mechanism to cause it to reciprocate during each operation of the saw, means carried by the plunger for opening the valved port during the cutting stroke of the saw, and a pressure chamber in communication with the distributing space to contain a body of air.

29. Feed mechanism for power hack saw machines comprising, in combination, a movable saw guide, a feed cylinder, a piston therein operatively connected to said guide, a closed distributing space, means for supplying fluid under pressure thereto, a measuring cylinder provided with a valved port communicating with the distributing space and provided adjacent thereto with a port connected to the feed cylinder above said piston, and a plunger in said measuring cylinder having means for connecting it to an operating part of the saw, said plunger being provided with means adapted to open said valved port and establish communication between the feed cylinder and the distributing space, the plunger of the measuring cylinder acting, when raised, to withdraw fluid from said feed cylinder.

30. Feed mechanism for power hack saw machines comprising, in combination, a vertically movable saw guide, a feed cylinder, a piston therein operatively connected to said guide, a closed distributing space, means for supplying fluid under pressure thereto, a measuring cylinder provided with a valved port communicating with the distributing space, and provided adjacent thereto with a port connected to the feed cylinder above said piston, a plunger in the measuring cylinder having means for connecting it to an operating part of the saw, said plunger being provided with means to open said valved port to establish communication between the distributing space and the feed cylinder, the plunger of the measuring cylinder acting, when raised, to withdraw fluid from the feed cylinder, a release passage leading from the feed cylinder above its piston, and a valve in said drain pipe.

31. Feed mechanism for power hack saw machines comprising, in combination, a vertically movable saw guide, a feed cylinder, a piston therein operatively connected to said guide, a closed distributing space, means for supplying fluid under pressure thereto, a measuring cylinder provided with a valved port communicating with the distributing space, and provided adjacent thereto with a port connected to the feed cylinder above said piston, a plunger in the measuring cylinder having means for connecting it to an operating part of the saw, said plunger being provided with means to open said valved port to establish communication between the distributing space and the feed cylinder, the plunger of the measuring cylinder acting, when raised, to withdraw fluid from the feed cylinder, a release passage connecting the feed cylinder above its piston to said distributing space, and a three-way valve at the juncture of said drain pipe and distributing space and provided with a discharge branch through which fluid from the drain pipe and distributing space is drained.

32. Feed means for power hack saw machines comprising, in combination, a supporting guide which is movable toward and away from the work, a feed cylinder, a piston therein operatively connected to said guide, a closed distributing space to contain a fluid, means to pump fluid under pressure into said space, an adjustable relief valve connected to said space to permit escape of fluid therefrom above a predetermined pressure, measuring means operative during the cutting stroke of the saw to transfer fluid from said distributing space to the cylinder against the piston to feed the saw to its work, and means to release a portion of said fluid from the cylinder space during the non-cutting stroke of the saw.

33. Feed means for power hack saw machines comprising, in combination, a saw supporting guide which is movable toward and away from the work, a feed cylinder, a piston therein operatively connected to said guide, a closed distributing space to contain a fluid, means to pump fluid under pressure into said space, a relief pipe extending upwardly from said distributing space and provided at its upper end with a relief valve and beyond said relief valve with a down-turned terminal, measuring means operative during the cutting stroke of the saw to transfer fluid from said distributing space to the cylinder against the piston to feed the saw to its work, and means to release a portion of said fluid from the cylinder space during the non-cutting stroke of the saw.

34. Feed mechanism for power hack saw machines comprising, in combination, a movable saw supporting guide, a feed cylinder, a piston therein operatively connected to said guide, to feed the saw to its work, a closed distributing space, a reservoir inclosing said feed cylinder and the distributing space, a pump for pumping liquid from said reservoir into said distributing space under pressure, means to intermittently connect said distributing space with the cylinder to admit fluid under pressure against said piston and for withdrawing fluid from the cylinder space, and valved means for releasing fluid from the feed cylinder and from the distributing space to said reservoir.

35. Feed mechanism for power hack saw machines comprising, in combination, a movable saw supporting guide, a feed cylinder, a piston therein operatively connected to said guide to feed the saw to its work, a closed distributing space, a reservoir inclosing said feed cylinder and the distributing space, a pump for pumping liquid from said reservoir into said distributing space under pressure, a measuring cylinder connected to said distributing space through a valved port, a passage connecting said measuring cylinder to the feed cylinder above its piston, a plunger in the measuring cylinder provided with means, operative at one limit of its stroke, to open the valved port to permit flow of fluid under pressure from the distributing space to the feed cylinder, said plunger operating during its rising stroke to withdraw a portion of the fluid from said feed cylinder.

36. Feed mechanism for power hack saw machines comprising, in combination, a movable saw supporting guide, a feed cylinder, a piston therein operatively connected to said guide to feed the saw to its work, a closed distributing space, a reservoir inclosing said feed cylinder and the closed distributing space, a pump for pumping liquid from said reservoir into said distributing space, a measuring cylinder connected to said closed space through a valved port, a passage connecting the said measuring cylinder to the feed cylinder above its piston, a plunger in the measuring cylinder provided with means, operative at one limit of its stroke, to open the valved port to permit flow of fluid under pressure from the distributing space to the feed cylinder, said plunger operating during its rising stroke to withdraw a portion of the fluid from the feed cylinder, a relief pipe connected to said distributing space and provided with a down-turned terminal which discharges into said reservoir, and an adjustable relief valve in said pipe.

37. Feed mechanism for power hack saw machines comprising, in combination, a movable saw supporting guide, a feed cylinder, a piston therein operatively connected to said guide to feed the saw to its work, a closed distributing space, a reservoir inclosing said pump and distributing space, a pump for pumping liquid from said reservoir into said distributing space, means to admit fluid under pressure from said distributing space to the cylinder above its piston and for withdrawing fluid from the cylinder space, a pipe for drawing fluid from the feed cylinder above its piston to permit the piston to rise in the feed cylinder, and a valve operative to connect said drain pipe with the distributing space and to drain the liquid from the pipe and space to said reservoir.

In testimony whereof I claim the foregoing as my invention I hereunto append my signature at Racine, Wisconsin, this 15th day of July, 1918.

ANDREW RASMUSSEN.